(12) United States Patent
Robitaille

(10) Patent No.: US 9,979,663 B2
(45) Date of Patent: May 22, 2018

(54) TCP PERFORMANCE PREDICTOR

(71) Applicant: Accedian Networks Inc., St-Laurent (CA)

(72) Inventor: Claude Robitaille, St-Placide (CA)

(73) Assignee: Accedian Networks Inc., St-Laurent (CA)

( * ) Notice: Subject to any disclaimer, the term of this patent is extended or adjusted under 35 U.S.C. 154(b) by 71 days.

(21) Appl. No.: 14/733,083

(22) Filed: Jun. 8, 2015

(65) Prior Publication Data

US 2016/0359753 A1    Dec. 8, 2016

(51) Int. Cl.
| | | |
|---|---|---|
| *H04L 12/825* | (2013.01) | |
| *H04L 12/801* | (2013.01) | |
| *H04L 12/26* | (2006.01) | |
| *H04L 12/24* | (2006.01) | |

(52) U.S. Cl.
CPC .......... *H04L 47/25* (2013.01); *H04L 43/0864* (2013.01); *H04L 43/0882* (2013.01); *H04L 43/0888* (2013.01); *H04L 47/127* (2013.01); *H04L 41/147* (2013.01)

(58) Field of Classification Search
CPC ... H04L 47/25; H04L 43/0864; H04L 47/127; H04L 43/0888
See application file for complete search history.

(56) References Cited

U.S. PATENT DOCUMENTS

| | | | | |
|---|---|---|---|---|
| 8,830,833 | B2* | 9/2014 | Bugenhagen | H04L 41/5003 370/235 |
| 2002/0181494 | A1* | 12/2002 | Rhee | H04L 29/06 370/465 |
| 2003/0112878 | A1* | 6/2003 | Kloper | H04B 7/18547 375/259 |
| 2013/0163455 | A1* | 6/2013 | Oguchi | H04W 24/02 370/252 |
| 2016/0191362 | A1* | 6/2016 | Hwang | H04L 43/0864 370/253 |

OTHER PUBLICATIONS

Padhye et al., Modeling TCP Throughput: A Simple Model and its Empirical Validation, Proc ACM SIGCOMM 1998.*
Floyd et al., Equation-Based Congestion Control for Unicast Applications, Proc ACM SIGCOMM 2000, Stockholm, Aug. 2000.*
Widmer et al, TCP-Friendly Multicast Congestion Control (TFMCC): Protocol Specification, Aug. 2006, Network Working Group, RFC 4654.*

* cited by examiner

*Primary Examiner* — Mohammad Adhami
*Assistant Examiner* — Shailendra Kumar
(74) *Attorney, Agent, or Firm* — Nixon Peabody LLP

(57) ABSTRACT

Technology is disclosed herein for monitoring a network path. In an implementation, a device on a network path obtains a burst capacity of the network path, determines a round trip time associated with a burst of traffic sent over the network path, and determines a predicted throughput of the network path based at least in part on the burst capacity of the network path and the rount trip time of the burst of traffic.

15 Claims, 15 Drawing Sheets

TCP PERFORMANCE PREDICTOR

FIELD OF THE INVENTION

The present disclosure relates to the Transmission Control Protocol (TCP), specifically to measuring the ability of a network to support TCP flows with adequate performance.

BRIEF SUMMARY

Technology is disclosed herein for monitoring a network path. In an implementation, a device on a network path obtains a burst capacity of the network path, determines a round trip time associated with a burst of traffic sent over the network path, and determines a predicted throughput of the network path based at least in part on the burst capacity of the network path and the rount trip time of the burst of traffic.

In some implementations, the device analyzes the predicted throughput to determine if the predicted throughout satisfies performance criteria associated with the network path. The device may alert on the predicted throughput not satisfying the performance criteria for the network path. The device may also take remedial action upon the predicted throughput not satisfying the performance criteria for the network path, such as by adjusting a circuit information rate (CIR) value for the network path.

In other implementations, the device may obtain the burst capacity of the network path by performing baselining to ascertain the burst capacity of the network path. The the round trip time associated with the burst of traffic may in some scenarios be an average round trip time associated with the burst of traffic.

In another implementation, a method to predict the throughput of a network path in a network using a first and second transmission control protocol (TCP) predictor module comprises: transmitting by the first TCP predictor module a plurality of test packets at wirespeed to a second TCP predictor module, said test packet comprising a sequence number and a timestamp; receiving by the second TCP predictor module said test packet and comparing said sequence number with the largest of the previously received sequence numbers; transmiting by the second TCP predictor module a reply packet comprising the latest sequence number received, a timestamp, and an alarm notification if said sequence number is larger than the largest of the previously received sequence numbers plus one; and when an alarm is received, computing by the first TCP predictor an average round trip time and a burstability measure based on the largest of the previously received sequence numbers.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
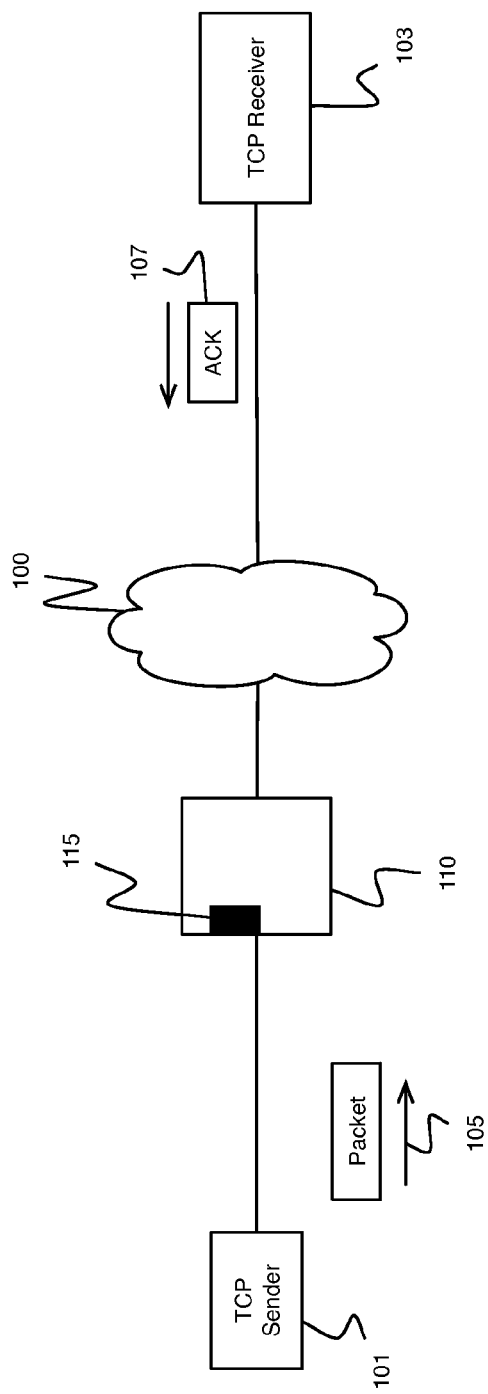
FIG. 1 is a prior art example of a TCP network.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 depicts a prior art network that comprises a Transmission Control Protocol (TCP) sender 101 coupled to a TCP receiver 103 via a network 100. The TCP sender sends TCP packets (or frame) 105 to the TCP receiver 103 via the network 100 which may comprise several networks owned by different network operators. The TCP receiver 103 acknowledges the receipt of the TCP packet 105 by sending, via the network, an acknowledgement packet (reply) 107 to the TCP sender 101. The TCP sender 101 accesses the network 100 via a port 115 of a first network device 110. The port 115 generally implements one or more traffic control (and/or traffic conditioning) functions such as policing or traffic shaping which are used to control the rate and burstiness of packets sent by a TCP sender and ensures it is within contracted boundaries (e.g. a Circuit Information Rate (CIR)) as per existing standards. As known in the art, traffic control functions can be implemented anywhere in the network at different boundaries.

The traffic control functions settings may negatively impact the overall performance of the TCP flow between a sender and a receiver. The network operator requires the ability to verify or predict the performance of a network path, more specifically as it relates to TCP performance and ability to burst.

In a first embodiment, two TCP predictors are used at both end of the network to predict the ability of a network path, within the boundaries of a given operator, to support a contracted throughput and related TCP performance. Periodical monitoring periods evaluate two network metrics, well known in the art, affecting the TCP throughput, namely the Round Trip Time (RTT) and burstability (e.g. burst capacity), to ensure they are within adequate bounds. Although well known in the art, the burstability is usually neglected and misunderstood, even if it has a great impact on the TCP end-to-end performance. By measuring these two network metrics periodically and computing or deriving a predicted throughput metric, the operator can ensure the TCP flows using a similar path or setting continuously receives adequate and expected throughput performance.

The burstability is a one-way metric, while RTT is a two-way metric. Together, they are combined into a simple formula that expresses the Predicted Throughput (PT) in bits per second (bps). The formula is:

PT (in bps)=Burst capacity (in bits)/RTT (in second)   (1)

A single measurement is not sufficient because of the high variability in network conditions. The embodiment provides a continuous monitoring by repeatedly executing monitoring periods and optionally archiving the measurements for trend analysis.

Figure 2:
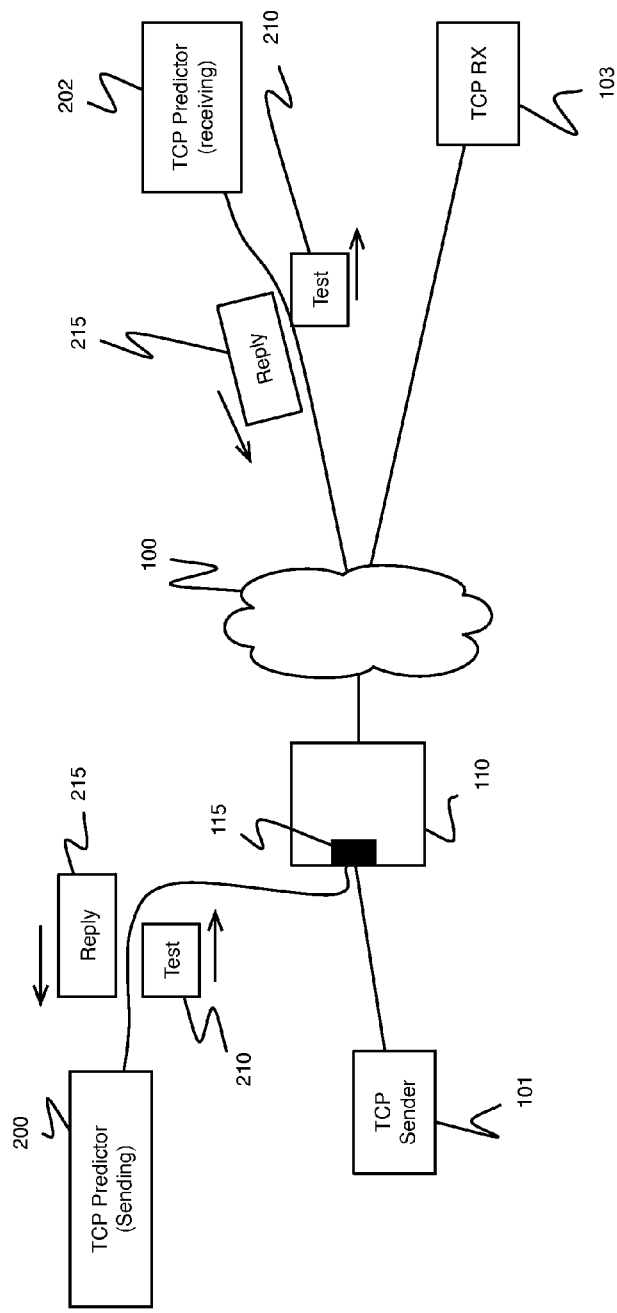
FIG. 2 is an example of a first embodiment using TCP predictors and in-band communication.

Referring to FIG. 2, two TCP predictor modules 200, 202 are used at each end of the network (or at the boundaries of the domain or sub-domain controlled by the operator). These modules can be available on standalone hardware devices or embedded in any other network devices such as Network Interface Device (NID), testing, switching or routing devices. A first predictor module acts as the sending end 200, sending bursts of test packets 210 to the second predictor module 202 which is at the receiving end. The second predictor module 202 sends a reply packet packet 215, including a timestamp, to the first predictor upon receipt of a test packet 210. In this configuration, the first predictor may access the network using the same port as the TCP sender 101 to verify the settings. The test packet and Reply may not need to be at layer 4 (TCP layer) and can optionally be sent at layer 2 or 3.

Figure 3:
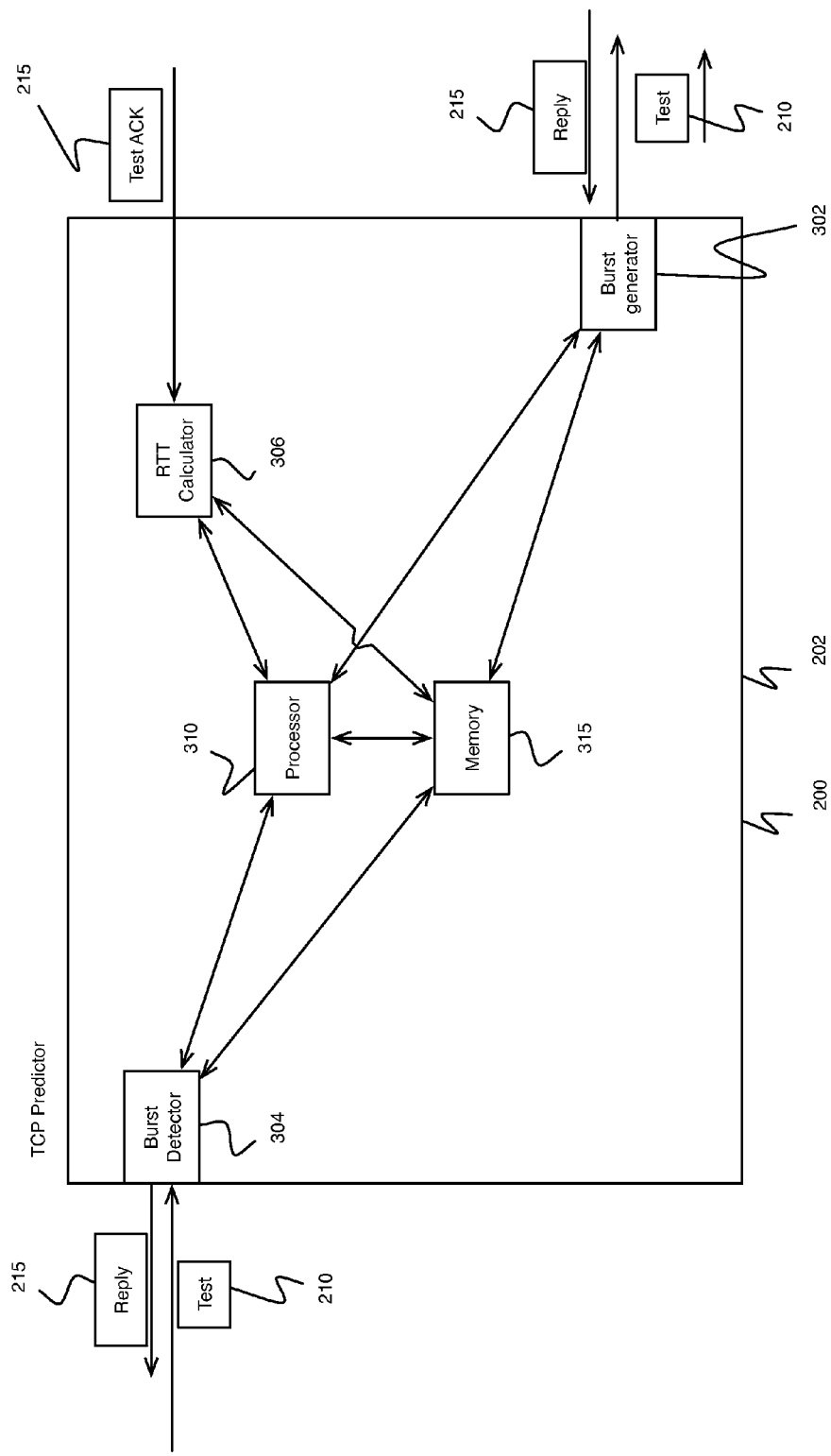
FIG. 3 is an example of a device supporting the TCP predictor function.

Referring to FIG. 3, a TCP predictor module 200, 202 comprises a test packet burst generator 302, a packet burst detector 304 and an RTT calculator function. The burst generator, burst detector and RTT calculator functions are executed by a processor 310. These functions store and access information on the test packets and other parameters used to execute the embodiment in one or more memory 315.

The burst generator function 302 generates bursts of test packets 210 including a timestamp and a sequence number. The burst detector function 304 receives the test packets, generate corresponding reply packets 215 which are returned to the other TCP predictor's. When the TCP predictor 200 receives a reply 215, the RTT calculator function computes the Round Trip Time (RTT) of the test packet using known algorithms such as Two-Way Active Measurement Protocol (TWAMP) and/or ITU-T Y.1731.

The location of the TCP predictors is chosen while considering the domain boundaries of the operator and the location of the active traffic conditioning such as traffic policing and shaping. The TCP predictor sending the burst can be located upstream from traffic policing and shaping function. Alternatively, the test point could be anywhere within the operator domain.

Initially, a baselining step is optionally performed by the TCP predictors to determine base parameters such as $B_b$, the baseline burst handled by the network. Generally, the standard 1518 Bytes packet size at layer 2, or 1500 B at layer 3 is used for the test. Optionally, the network MTU may be measured as part of the baselining step and used as the packet size. Alternatively, the monitoring periods start with a configured value for $B_b$ and the value of $B_b$ adapts with subsequent monitoring periods.

The CIR of the circuit may also be determined during the baselining step by measurement by direct measurement using a precisely spaced packet traffic generator as known in the art. Alternatively, the CIR may be provided by configuration. This is measured one-way since the network may not be symmetrical. Following the optional baselining step, one or more monitoring period are performed to measure PT, the predicted throughput.

Figure 4:
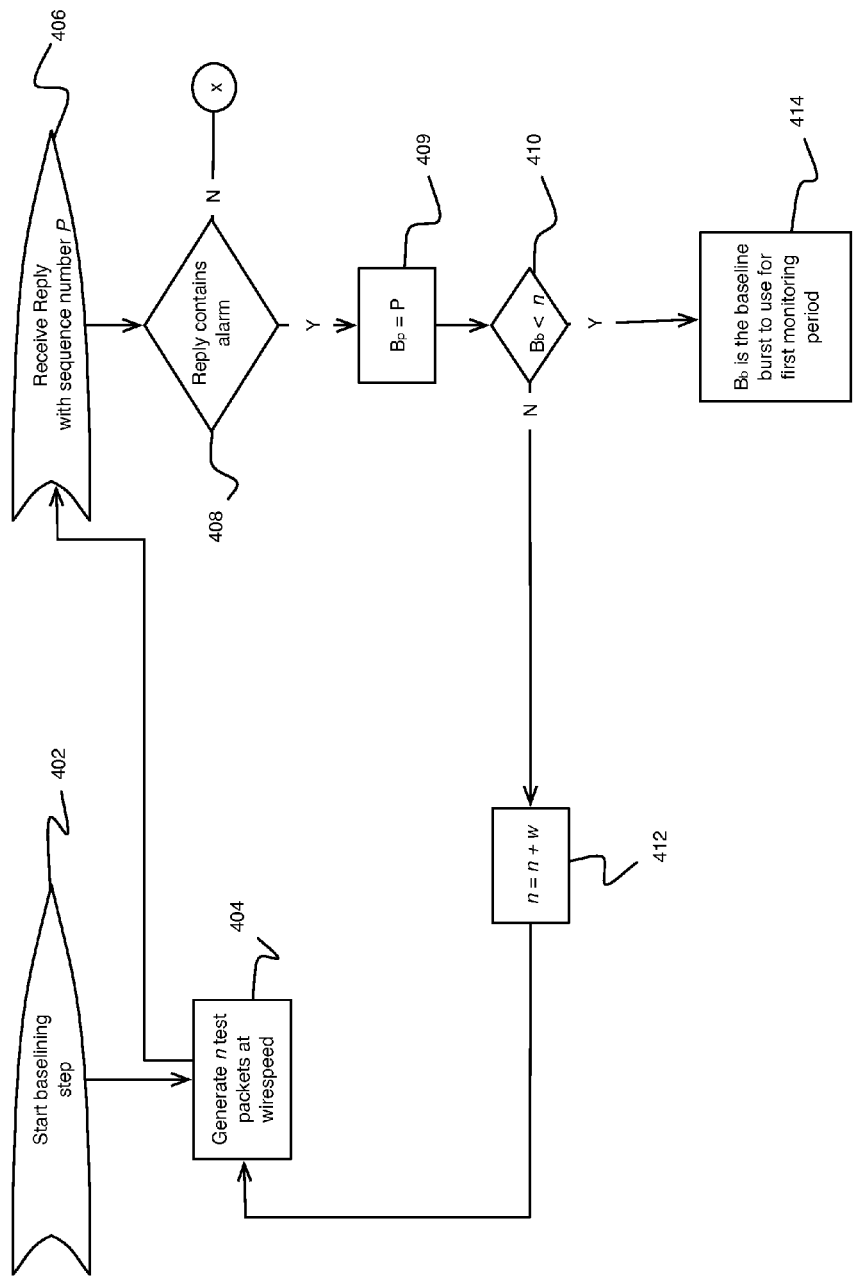
FIG. 4 is an example of the baselining step performed by the burst generator under the first embodiment.

FIG. 4 shows one embodiment of the baselining step from the burst generator function side. In this embodiment, the test packets and the replies for the test packets are done in both direction of the same network path. When the baselining step is initiated 402, the burst generator generates n test packets at substantially wirespeed and transmits 404 them to the burst detector via the network path. When the burst generator receives a reply packet returned by the burst detector with a sequence number P 406, the burst generator verifies whether the reply also contains an alarm 408, meaning a test packet was lost and $B_b$ should be set to P 409. If $B_b$ is smaller than n 410 then $B_b$ is the baseline burst to use for the first monitoring period 414, otherwise, n is incremented by w 412, and a new baseline test starts 404. The value of w may be a predetermined function of n (e.g. 25%*n) or a fixed value. If there is no alarm, the burst generator waits for the next reply.

Figure 5:
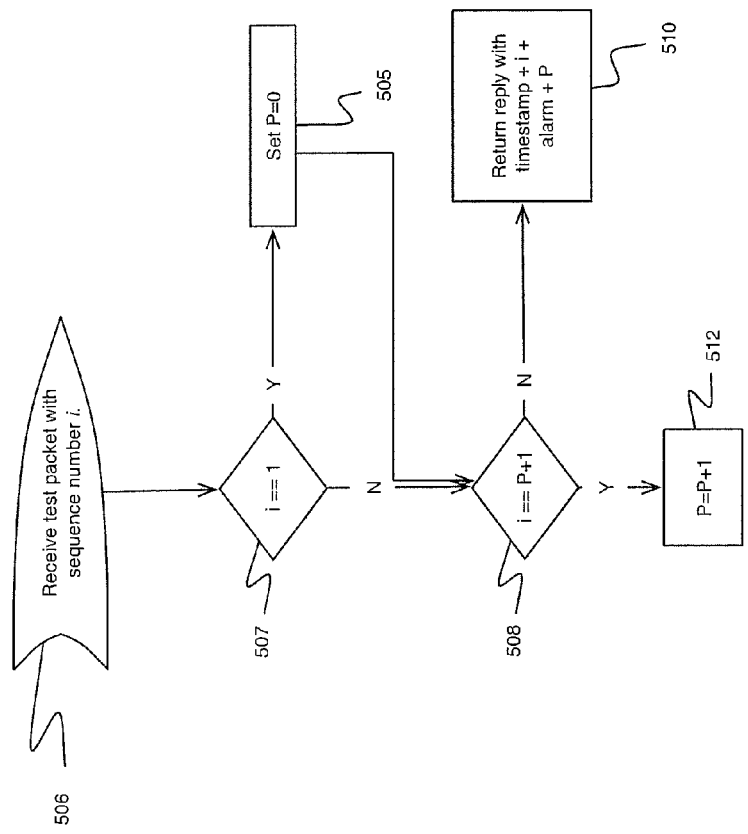
FIG. 5 is an example of the algorithm performed by the burst detector under the first embodiment for the baselining step or the monitoring period.

FIG. 5 shows one embodiment performed by the burst detector in the same configuration as per FIG. 4. The burst detector is initialized with P=0. When the burst detector receives a test packet with sequence number i 506, if i equals P+1 508, then the test packet is the next sequence number and P is set to P+1 512. If i equals 1 507, then P is reinitialized to zero indicating the start of a new burst 505. A reply is returned to the burst generator with the information in the test packet augmented with a timestamp and the same sequence number 514. If i does not equal P+1 508, the burst detecor returns the reply with the information in the test packet augmented with a timestamp, an alarm, and the value of P which indicates the largest number of consecutive test packets received without loss 510.

Figure 6:
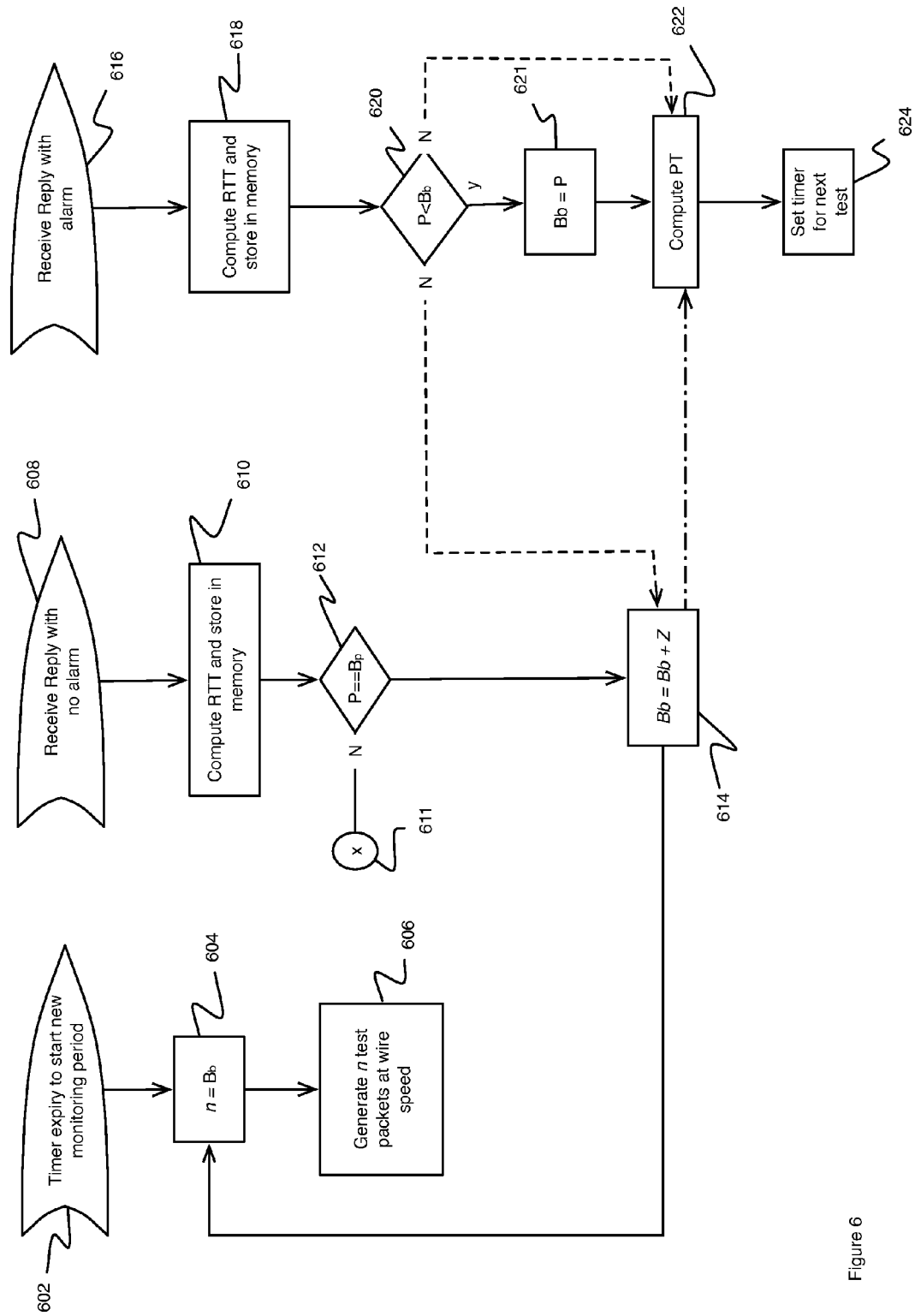
FIG. 6 is an example of the monitoring period performed by the burst generator under the first embodiment.

FIG. 6 shows an example of an algorithm performed by the burst generator for a monitoring period when the test packets and the replies for the test packets are done within the same network path. When a timer expires 602 to start a new monitoring period, n is set to $B_b$ (computed during the baselining step or from the last monitoring period) 604. The burst generator generates n test packets at wirespeed 606 with sequence numbers incremented from 1 to n. When a reply is received with no alarms 608, the RTT is computed based on the timestamps and stored in memory 610. If P is not equal to $B_b$ 612 then the burst generator waits for another reply 611. If P equals $B_b$ 612, the entire burst has been received by the burst detector, optionally, $B_b$ is incremented by z 614 and another monitoring period is initiated immediately, otherwise the Predicted Throughput (PT) is computed 622 and a timer is set to start the next monitoring period 624. The value of z may be a function of $B_b$ or may be fixed. If the burst generator receives a reply with an alarm 616, the RTT is computed and stored in memory 618. If the value of P is smaller than $B_b$ 620, then $B_b$ is set to P 621, the Predicted Throughput (PT) is computed 622 and a timer is set to start the next monitoring period 624. If P equals $B_b$ 620, the entire burst has been received by the burst detector. In one embodiment, the timer is set for the next monitoring period 624. Optionally, $B_b$ is incremented by z 614 and another monitoring period is initiated or the timer is set 624 and the new value of $B_b$ is used for the next monitoring period.

The measured RTT during a monitoring period are used to compute an Average RTT (ARTT). All or a predetermined number of stored RTT measurements for the monitoring period is used to measure the ARTT. The smallest and largest values of RTT measured can optionally be considered outliers and removed from the average computation. Any known algorithms to compute the ARTT based on the stored set of RTT can be used. Absolute precision on the RTT is not necessary.

The following formula is applied to the two computed metrics measured in each monitoring interval is:

$$PT=\text{Predicted Throughput (in bps)}=\text{MIN}(B_b/\text{ARTT (in second)}, \text{CIR})$$

IF PT is greater or equal to the CIR it means that the configured CIR may be limiting the performance of the TCP sessions using the same path.

Figure 7:
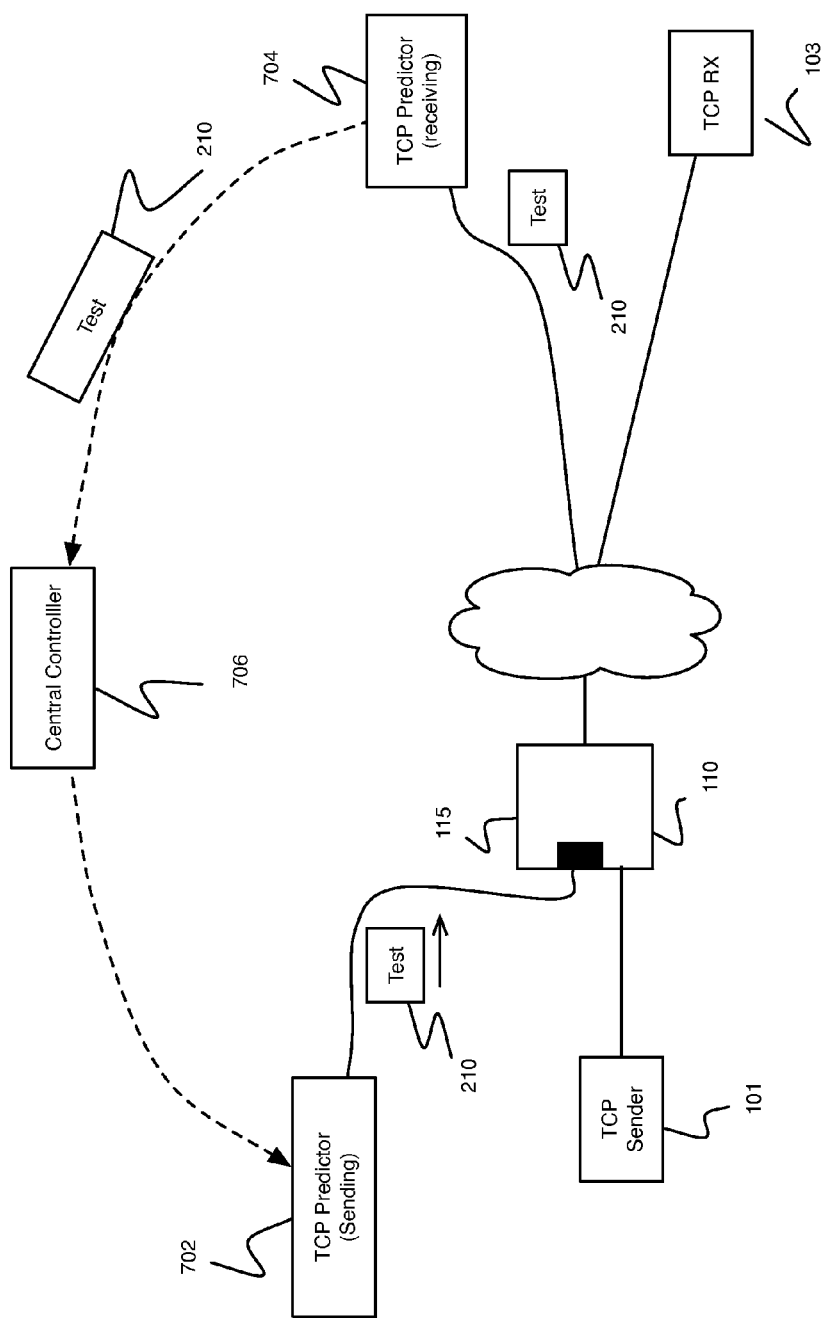
FIG. 7 is an example of a second embodiment using two TCP predictors and a central controller.

In another embodiment, as per FIG. 7 (similar example network as per FIG. 2), a central controller 706 is used to control and receive data from the TCP predictors 702, 704. The central controller can be implemented as part of one of the predictors or located on a separate device with a processor or as part of a network management system. The central controller can manage a plurality of burst generator-detector pairs while allowing these functions to be simplified. In this embodiment, the test packets are sent in-band in the network path between the burst generator 702 and the burst detector 704 but the data collection for the test is done out-of-band to the central controller 706. The functions of the burst generator, burst detector for this embodiment are exemplified in FIG. 8 and FIG. 9 respectively.

Figure 8:
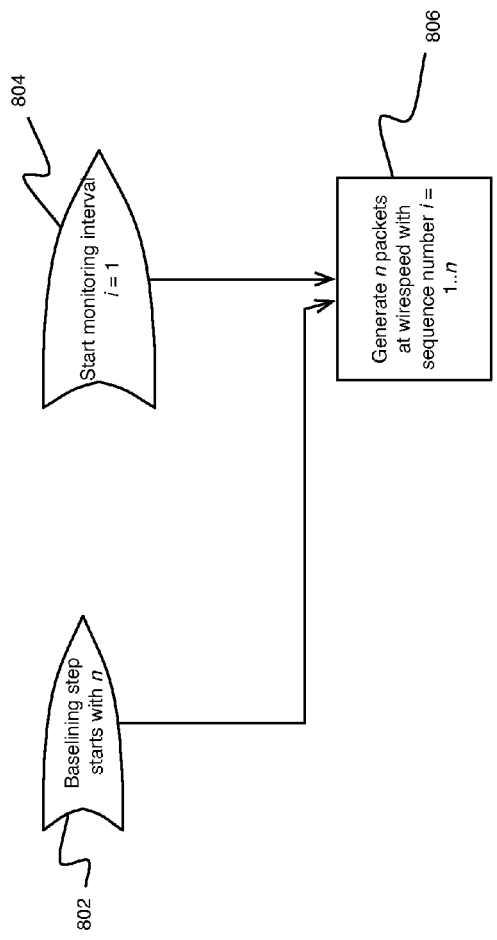
FIG. 8 is an example of the baselining step performed by the burst generator under the second embodiment.

As per FIG. 8, the burst generator receives commands from the central controller to start a baselining step 802 or to start a monitoring interval 804. In both cases, the burst generator transmits n packets at wirespeed with sequence numbers incrementing from i to n 806.

Figure 9:
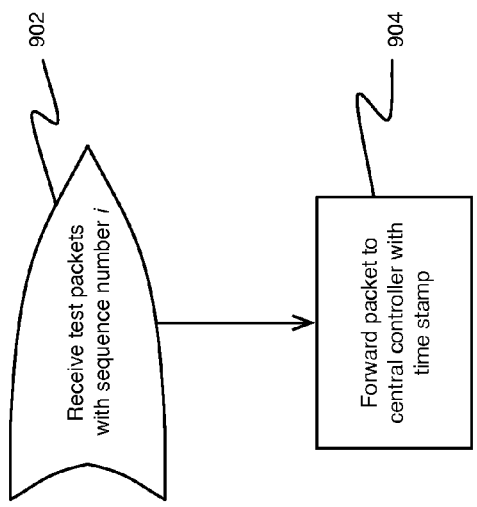
FIG. 9 is an example of the algorithm performed by the burst detector under the second embodiment for the baselining step or the monitoring period.

Referring to FIG. 9, the burst detector receives a test packet with a sequence number i 902. A current timestamp is added to the test packet, which is then forwarded out of band to the central controller 904.

Figure 10:
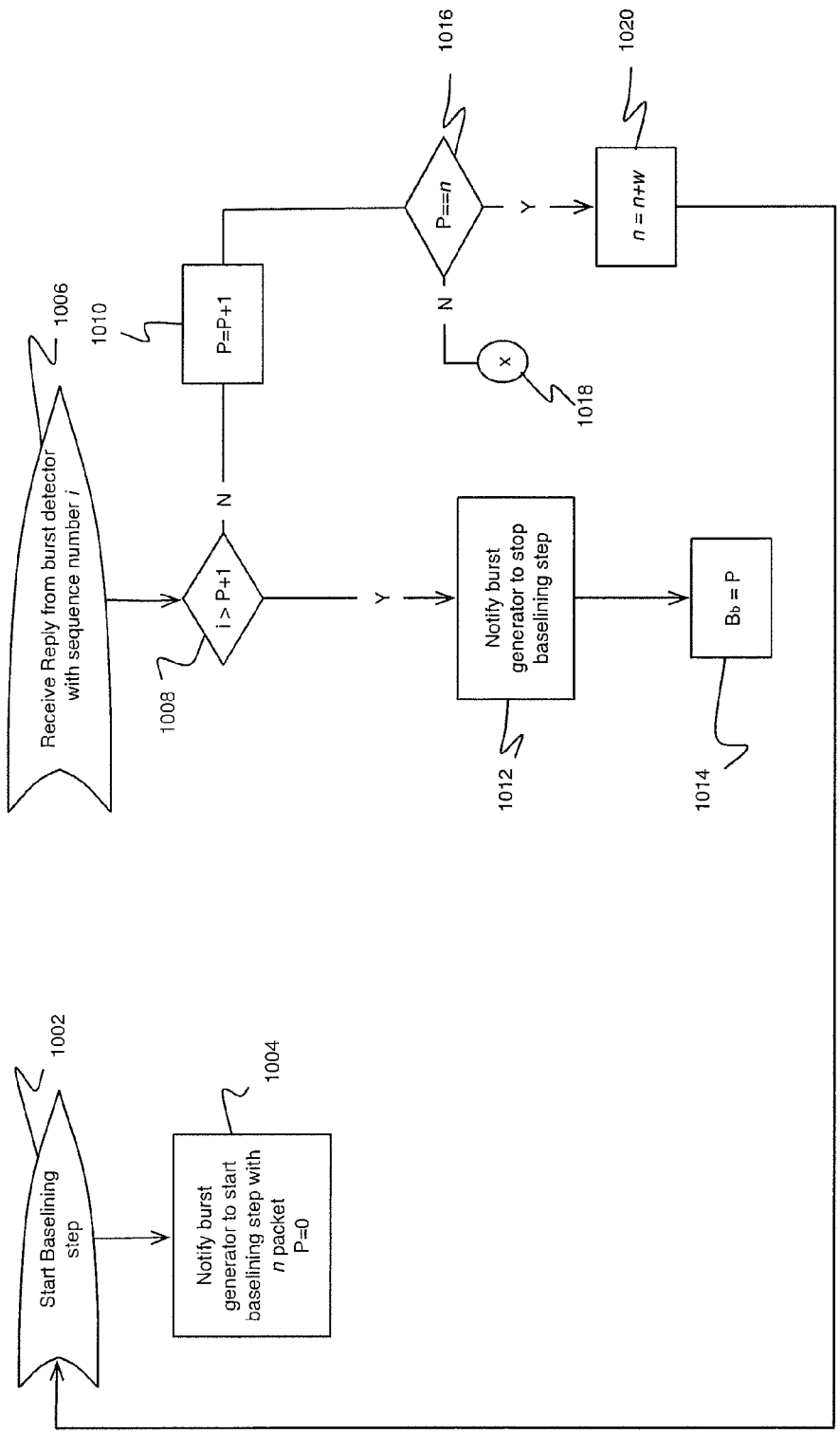
FIG. 10 is an example of the algorithm performed by the central controller for the baselining step under the second embodiment.

FIG. 10 shows an example of the central controller algorithm when performing the baselining step 1002. The central controller notifies the burst generator to start the baselining step with n test packets and the value of P is set to zero 1004. The value of n may be preconfigured or pre-determined. When the central controller receives a test packet forwarded from the burst detector with sequence number i 1006, it checks if i is greater than P+1 1008 in which case a test packet has been lost and the central controller optionally notifies the burst generator to stop the baselining step 1012, the value of $B_b$ is set to P 1014. if i is equal to P+1 1008, then P is incremented by one 1010. If P equals n 1016, then the baselining test is completed 1018. Optionally, n is incremented by w 1020, and another baselining step is initiated until a burst returns a loss. The value of w may be a predetermined function of n (e.g. 25%*n) or a fixed value.

Figure 11:
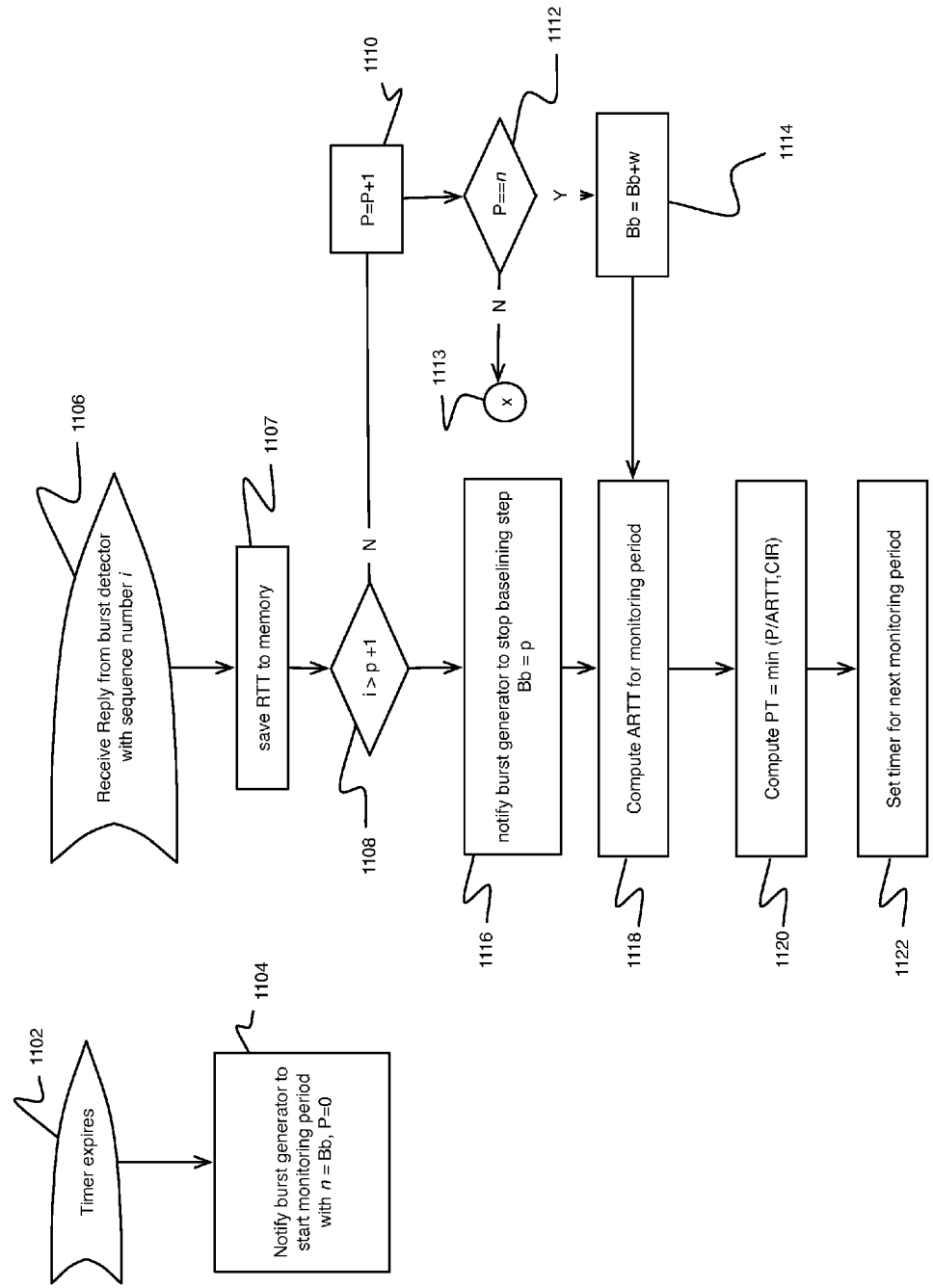
FIG. 11 is an example of the algorithm performed by the central controller for the monitoring period under the second embodiment.

FIG. 11 shows an example of the central controller algorithm when performing monitoring periods. When a timer expires 1102, the central controller notifies the burst generator to start a monitoring period with n=$B_b$ test packets and the value of P is set to zero 1104. The value of $B_b$ may be preconfigured or determined during the baselining step. When the central controller receives a test packet forwarded from the burst detector with sequence number i 1106, it saves the RTT in memory 1107. The central controller checks if i is greater than P+1 1108, in which case a test packet has been lost, the central controller optionally notifies the burst generator to stop the baselining step 1116 and the value of $B_b$ is set to P. The ARTT is calculated for the monitoring period based on the saved RTT values as described above 1118. The Predicted Throughput (PT) is computed 1120 and a timer is set to start the next monitoring period 1122. If i is not greater than P+1 1108, then P is incremented by one 1110. If P is not equal to n, the central controller waits for further test packets from the burst detector 1113. Otherwise the monitoring period is completed and the ARTT is computed for the monitoring period based on the saved RTT values as described above 1118. The Predicted Throughput (PT) is computed 1120 and a timer is set to start the next monitoring period 1122. Optionally, n is incremented by w 1114, such that the burst used for the next monitoring period is larger. The value of w may be a predetermined function of n (e.g. 25%*n) or a fixed value.

Figure 12:
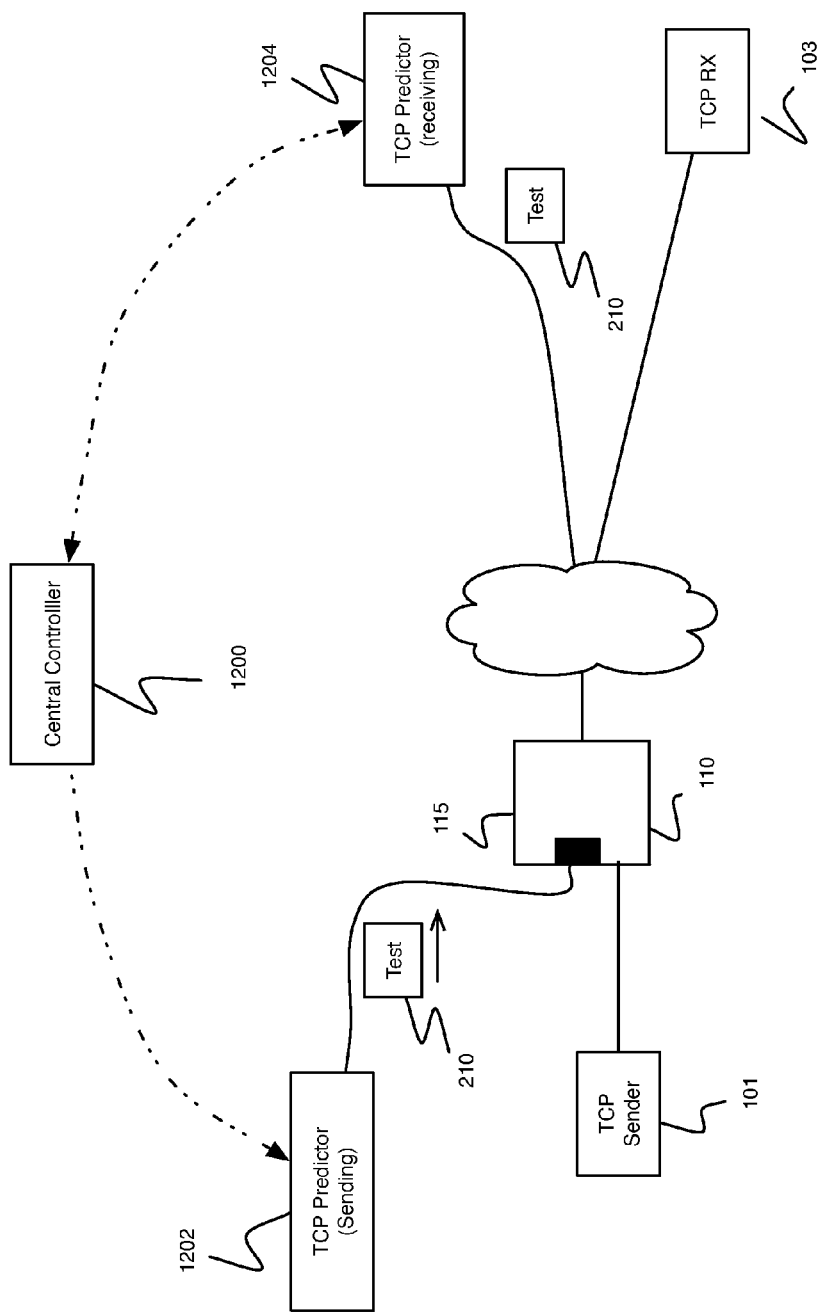
FIG. 12 is an example of a third embodiment using two TCP predictors and a central controller.

In a third embodiment, as per FIG. 12 (similar example network as per FIG. 7), a central controller 1200 is used to control and poll data from the TCP predictors 1202, 1204. The central controller can be implemented as part of one of the predictors or located on a separate device with a processor or as part of a network management system. The central controller can manage a plurality of burst generator-detector pairs while allowing these functions to be simplified. In this embodiment, the test packets are sent in-band in the network path between the burst generator 1202 and the burst detector 1204. The central controller controls the start of the monitoring period and polls the results from the burst detector using standard commands such as Command Line Interface (CLI) to the devices. The functions of the burst generator, burst detector for this embodiment are exemplified in FIG. 8 and FIG. 13 respectively.

In this third embodiment, the burst generator function is as per FIG. 8 above. The burst generator receives commands from the central controller to start a baselining step 802 or to start a monitoring interval 804. In both cases, the burst generator transmits n packets at wirespeed with sequence numbers incrementing from i to n 806.

Figure 13:
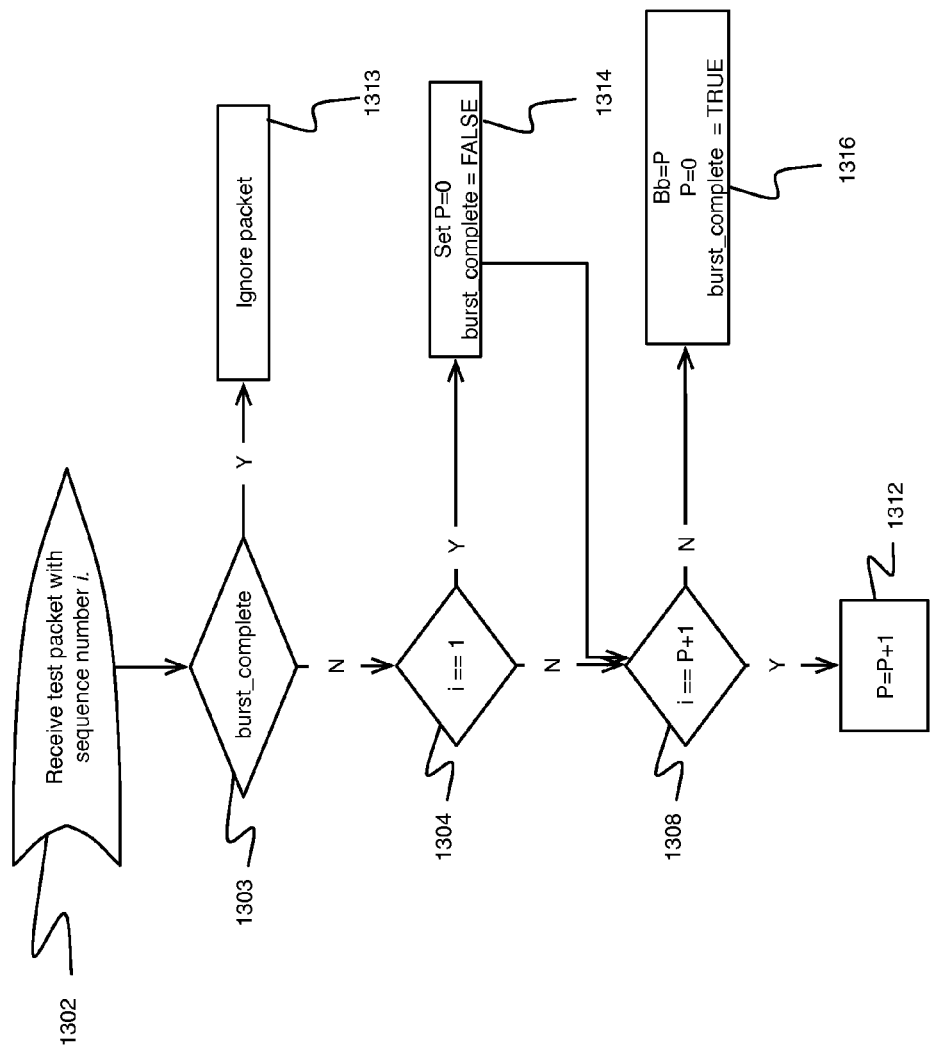
FIG. 13 is an example of the algorithm performed by the burst detector under the third embodiment for the baselining step or the monitoring period.

Referring to FIG. 13, the burst detector 1204 receives a test packet with a sequence number i 1302. If the variable burst_complete is FALSE 1303, then if i equals 1 1304, indicating the start of a new burst, then P is set to zero 1306 and the burst_complete variable is set to FALSE, otherwise, if i equals P+1 1308, the test packet is received in sequence and P is incremented by 1 1312, otherwise one or more test packet has been lost and the burst size $B_b$ is set to P indicating the number of consecutive packets received without loss, the burst_complete variable is set to TRUE indicating that the burst size has been established for this monitoring period and that the other packets for this burst can be ignored 1313.

Figure 14:
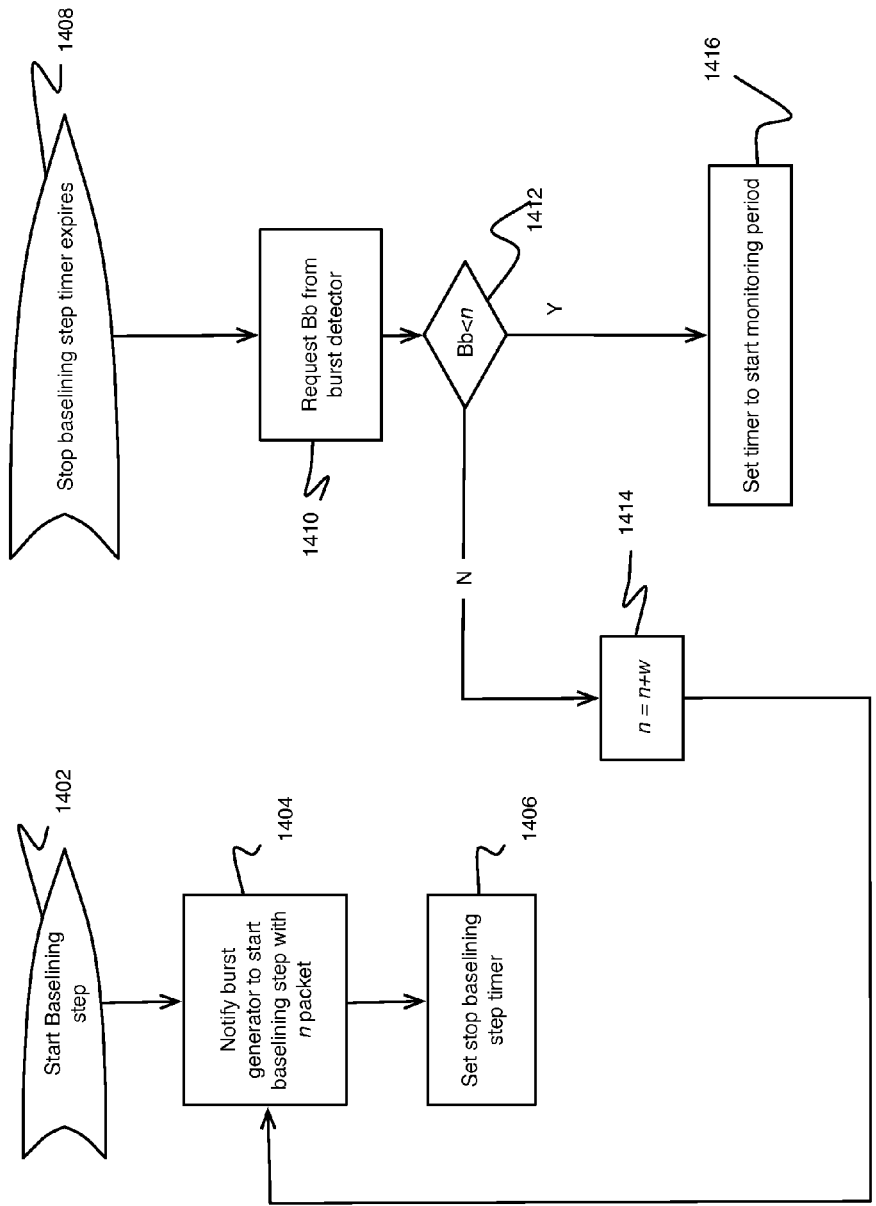
FIG. 14 is an example of the algorithm performed by the central controller for the baselining step under the third embodiment.

FIG. 14 shows an example of the central controller algorithm when performing the baselining step 1402. In the third embodiment, the central controller notifies the burst generator to start the baselining step with n test packets 1404. A timer to stop the baselining step is set to a predetermined value which is long enough to allow all the test packets to reach the other predictor's burst detector 1406. The value of n may be preconfigured or pre-determined. When the timer to stop the baselining step expires 1408, the central controller requests the current value of $B_b$ from the burst detector 1410. If $B_b$ is greater or equal than n 1412, then n is incremented by w 1414, and another baselining step is initiated until a burst returns a loss (Bb is smaller than n 1412). The value of w may be a predetermined function of n (e.g. 25%*n) or a fixed value.

Figure 15:
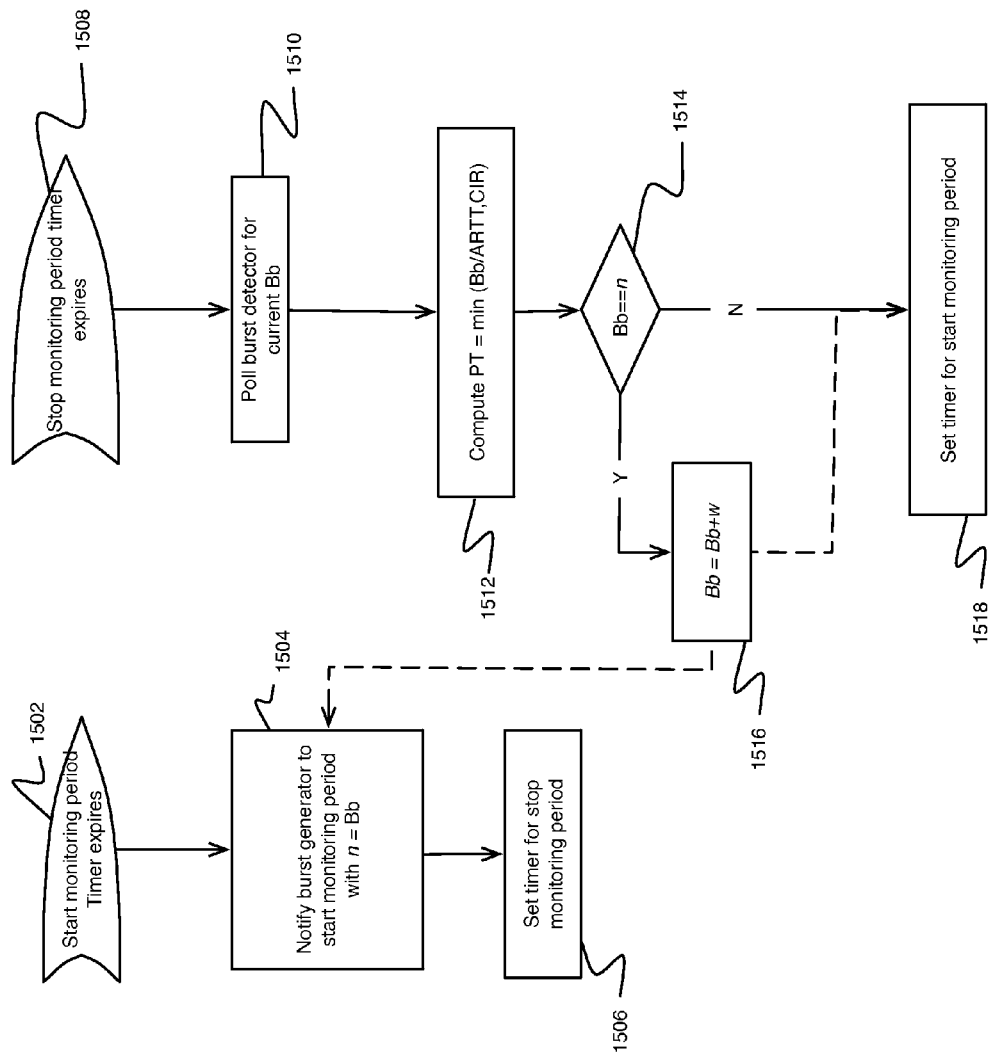
FIG. 15 is an example of the algorithm performed by the central controller for the monitoring period under the third embodiment.

FIG. 15 shows an example of the central controller algorithm when performing monitoring periods in the third embodiment. When a start monitoring period timer expires 1502, the central controller notifies the burst generator to start a monitoring period with n=$B_b$ test packets 1504. The value of $B_b$ may be preconfigured or determined during the baselining step. A timer to stop the monitoring period is set to a predetermined value which is long enough to allow all the test packets to reach the other predictor's burst detector 1506.

When the timer to stop the monitoring period expires 1508, the central controller polls the burst detector for the current value of $B_b$ 1510. The value of PT is computed using the current measured ARTT 1512. If $B_b$ equals n 1514 then the full burst has been received and the value of Bb is incremented by w 1516, such that the burst used for the next monitoring period is larger. The value of w may be a predetermined function of n (e.g. 25%*n) or a fixed value. Optionally another monitoring period is started immediately otherwise a timer is set to start the next monitoring period 1518 and the new value of Bb applies for the next monitoring period. If $B_b$ is smaller than n 1514 then a timer is set to start the next monitoring period 1518.

In this embodiment, the central controller monitors the RTT and computes the ARTT independently from the test packets using standard known methods to compute RTT for a path (e.g. TWAMP). The ARTT computation can be done during a monitoring period or asynchronously.

For all embodiments described above, when a PT is calculated, it can be reported to other network management systems periodically or only when the value of PT is outside predetermined boundaries. PT measurements can be stored and trend analysis can be performed periodically. An average PT measurement can also be maintained based on the historical PT to indicate improvement or degradation over a period of time. The trends and averages can be performed by the predictor (first embodiment) or the central controller (second and third embodiements) or by an external network management system. Any known techniques for trends analysis and averaging can be used for reporting. When the value of PT is outside a predetermined range, the operator may change the settings of the traffic control parameters or other settings to improve the throughput on the selected path.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for periodically monitoring a throughput of a network path having a circuit information rate (CIR), the method comprising:
    determining during a monitoring period a burst capacity of the network path by transmitting a number of test packets over the network path, the number of test packets based on the CIR and the last determined burst capacity of the network path;
    determining during the monitoring period, a round trip time of the network path;
    determining during the monitoring period, the throughput of the network path based on a lesser value of:
        the determined burst capacity of the network path divided by the determined roundtrip time of the network path, and
        the (CIR) for the network path; and
    modifying the CIR based on determined throughput for the network path.

2. The method of claim 1 further comprising analyzing the determined throughput to determine if the throughout satisfies performance criteria associated with the network path.

3. The method of claim 1 wherein modifying the CIR includes increasing the CIR when the determined burst capacity of the network path divided by the determined roundtrip time for the network path is greater than the CIR.

4. The method of claim 1 wherein modifying the CIR comprises reducing the CIR for the network path when the determined throughput is less than the CIR.

5. The method of claim 1 wherein determining the burst capacity of the network path includes performing a baselining step to ascertain an initial burst capacity of the network path, the baseline step including transmitting a number of test packets over the network path, the number of test packets based on the CIR.

6. The method of claim 1 wherein determining the round trip time comprises determining an average round trip time associated with the network path during the transmission of the number of test packets.

7. An apparatus comprising:
a processor;
one or more non-transitory computer readable storage media;
program instructions stored on the one or more computer readable storage media for periodically monitoring a network path having a circuit information rate (CIR) that, when executed by a processor, direct the processor to at least:
determine during a monitoring period, a burst capacity of the network path by transmitting a number of test packets over the network path, the number of test packets based on the CIR and the last determined burst capacity of the network path;
measure during the monitoring period, a round trip time for the network path;
calculate, during the monitoring period, a throughput of the network path based on the lesser value of:
the determined burst capacity of the network path divided by the measured round trip time, and
the CIR for the network path; and
modify the CIR based on determined throughput for the network path.

8. The apparatus of claim 7 wherein the program instructions further direct the processor to analyze the determined throughput to determine if the throughout satisfies performance criteria associated with the network path.

9. The apparatus of claim 8 wherein the program instructions further instruct the processor to increase the CIR when the determined burst capacity of the network path divided by the measured roundtrip time for the network path is greater than the CIR.

10. The apparatus of claim 7 wherein the modification of the CIR comprises reducing the CIR for the network path when the determined throughput is less than the CIR.

11. The apparatus of claim 7 wherein the program instructions, to determine the burst capacity of the network path includes directing the processor to perform a baselining step to ascertain an initial burst capacity of the network path the baseline step including transmitting a number of test packets over the network path, the number of test packets based on the CIR.

12. The apparatus of claim 7 wherein the round trip time associated with the burst of traffic comprises an average round trip time during the transmission of the number of test packets.

13. The apparatus of claim 7 wherein the modification of the CIR comprises reducing the CIR for the network path when the determined throughput is less than the CIR and increasing the CIR when the determined burst capacity of the network path divided by the measured roundtrip time for the network path is greater than the CIR.

14. A method to measure the throughput of a network path periodically in a network having a circuit information rate (CIR) using a first and second transmission control protocol (TCP) predictor module comprising:
transmitting by the first TCP predictor module a predetermined number of test packets at wirespeed to a second TCP predictor modJustile via the network path, each test packet comprising a sequence number and a timestamp;
receiving by the second TCP predictor module a test packet of the predetermined number of test packets via the network path and comparing the test packet sequence number with a largest of previously received sequence numbers;
transmitting by the second TCP predictor module a reply packet comprising the previous sequence number received, a timestamp, and an alarm notification when the test packet sequence number is larger than the largest of the previously received test packets sequence numbers plus one;
when an alarm is received by the first TCP predictor, computing an average round trip time and the burst capacity based on the largest of the previously received test packet sequence numbers; and
determining a throughput measurement based on the lesser of the burst capacity divided by the average round trip time and the CIR; and
modifying the CIR based on determined throughput measurement for the network path.

15. The method of claim 14 wherein said predetermined number of test packets is based on the largest burst transmitted over a previous period.

* * * * *